United States Patent
Miike

(10) Patent No.: US 7,082,611 B2
(45) Date of Patent: Jul. 25, 2006

(54) DISK CARTRIDGE AND DISK DRIVE APPARATUS

(76) Inventor: Masami Miike, c/o Sony Corporation, 7-35, Kitashinagawa 6-Chome, Shinagawa-Ku, Tokyo (JP)

( * ) Notice: Subject to any disclaimer, the term of this patent is extended or adjusted under 35 U.S.C. 154(b) by 403 days.

(21) Appl. No.: 10/637,508

(22) Filed: Aug. 11, 2003

(65) Prior Publication Data

US 2004/0075945 A1 Apr. 22, 2004

(30) Foreign Application Priority Data

Aug. 15, 2002 (JP) ............................. P2002-237052

(51) Int. Cl.
*G11B 23/03* (2006.01)
(52) U.S. Cl. ...................... 720/736; 360/133; 720/734; 720/737
(58) Field of Classification Search ................ 360/133; 720/736, 725, 728, 737, 734
See application file for complete search history.

(56) References Cited

U.S. PATENT DOCUMENTS

| 6,005,755 | A | * | 12/1999 | Muse et al. ................. 360/133 |
| 6,147,837 | A | * | 11/2000 | Schick et al. ............... 360/133 |
| 6,243,231 | B1 | * | 6/2001 | Morris et al. ............... 360/133 |
| 6,256,168 | B1 | * | 7/2001 | Hales et al. ................. 360/133 |
| 6,304,417 | B1 | * | 10/2001 | Bracken et al. ............. 360/133 |
| 6,377,538 | B1 | * | 4/2002 | d'Alayer de Costemore d'Arc ... 720/730 |
| 6,816,340 | B1 | * | 11/2004 | Oishi et al. ................. 360/133 |
| 6,922,312 | B1 | * | 7/2005 | Oishi ......................... 360/133 |
| 2001/0021083 | A1 | * | 9/2001 | Braken et al. .............. 360/133 |
| 2002/0131361 | A1 | * | 9/2002 | Oishi et al. ................. 369/291 |
| 2004/0027985 | A1 | * | 2/2004 | Inoue ......................... 369/291 |

FOREIGN PATENT DOCUMENTS

| JP | 10079185 A | * | 3/1998 |
| JP | 11110945 A | * | 4/1999 |
| WO | WO 9926242 A1 | * | 5/1999 |

* cited by examiner

*Primary Examiner*—William J Klimowicz
(74) *Attorney, Agent, or Firm*—Rader, Fishman & Grauer, PLLC; Ronald P. Kananen

(57) ABSTRACT

A rotor is provided which is rotatably disposed between a first shell and a recording medium, in a containing space formed inside the first shell and a second shell. The rotor includes a first wall formed along the circumferential direction of the rotor, and a part of the first wall is cut out to form a first opening. The second shell includes a second wall formed so as to overlap with the inside of the first wall along the outer circumference of the recording medium, on the outside in the radial direction of the outer circumference of the recording medium. The second wall and the first wall constitute a labyrinth structure portion for isolating the recording medium and the exterior of the recording medium from each other. With the rotor rotated, the first opening and a second opening constitute a head in/out opening.

13 Claims, 15 Drawing Sheets

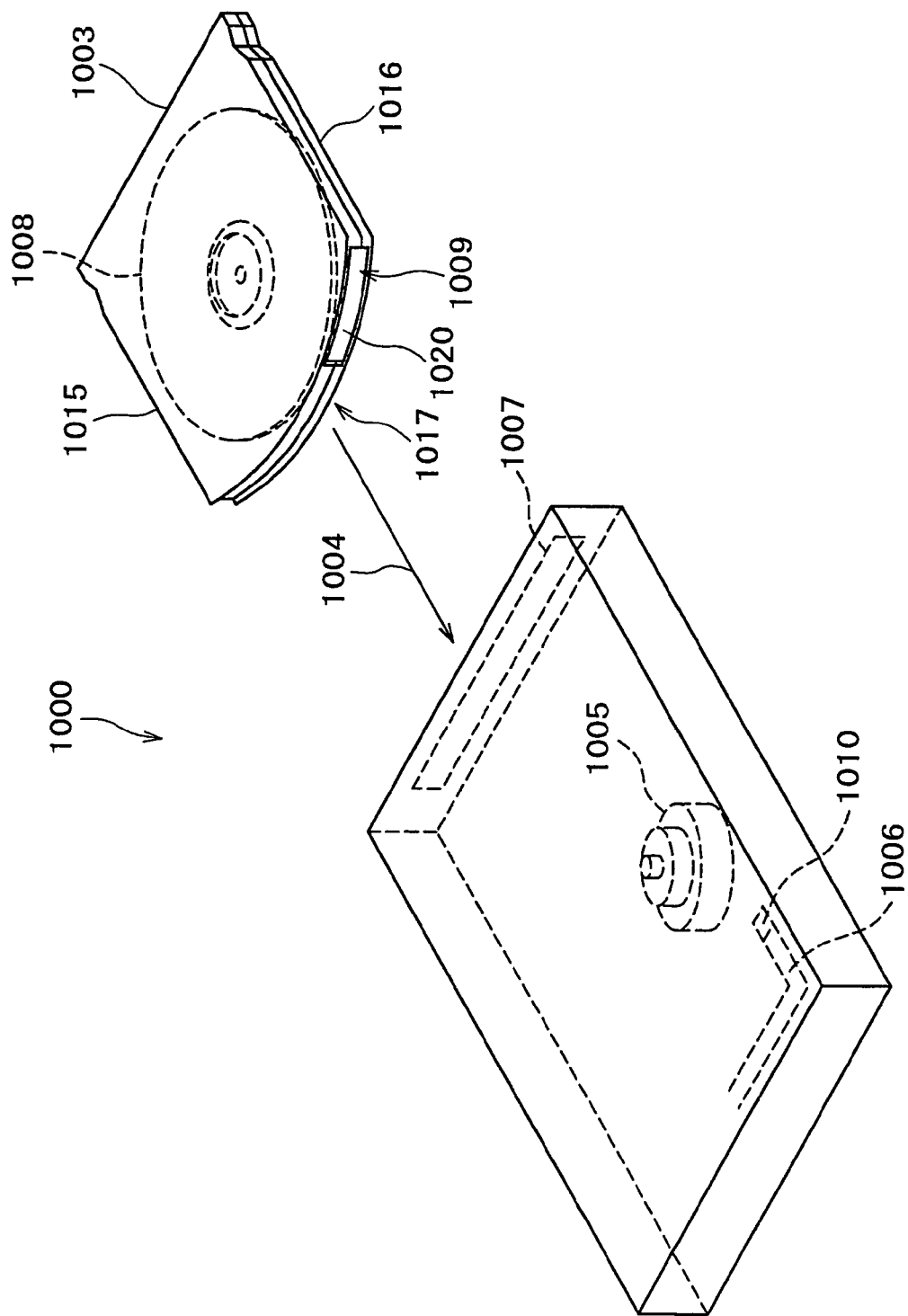

DISK CARTRIDGE AND DISK DRIVE APPARATUS

BACKGROUND OF THE INVENTION

The present invention relates to a disk cartridge containing a disk form recording medium therein and capable of being mounted into and dismounted from a recording medium drive, and a recording medium drive including the disk cartridge.

A recording medium drive can be incorporated in an electronic apparatus capable of recording and reproducing information, for example, a portable type computer.

Such kind of recording medium drive can removably mount a disk cartridge therein. The disk cartridge contains a disk form recording medium therein. The disk form recording medium is, for example, a hard disk, and is so designed that information can be magnetically recorded on the recording medium and the information recorded on the recording medium can be reproduced.

Such a recording medium drive is called a removable hard disk drive apparatus (R-HDD).

FIG. 12 shows an example of the conventional removable hard disk drive apparatus.

A disk cartridge 1003 can be removably inserted into the removable hard disk drive apparatus 1000 through an insertion port 1007 in the direction of arrow 1004.

The removable hard disk drive apparatus 1000 includes a spindle motor 1005 and a turning type head actuator 1006 therein.

After the disk cartridge 1003 is inserted into the removable hard disk drive apparatus 1000 though the insertion port 1007, the disk form recording medium 1008 in the disk cartridge 1003 is chucked by a chucking magnet relative to a disk table of a motor 1005.

When the motor 1005 is operated, the recording medium 1008 is rotated, and the head actuator 1006 enters into the disk cartridge 1003 through an opening 1009 thereof. A magnetic head 1010 on the head actuator 1006 is moved substantially in the radial direction of the recording medium 1008, i.e., the magnetic head 1010 is put into a seek motion, whereby information can be magnetically recorded on a track of the recording medium 1008 or magnetically reproduced from the track.

The disk cartridge 1003 shown in FIG. 12 contains the recording medium 1008 therein, and is formed of a plastic. The disk cartridge 1003 is comprised of a combination of an upper shell 1015 and a lower shell 1016, in which the recording medium 1008 is contained. A connection portion 1017 for connection between the upper shell 1015 and the lower shell 1016 is provided with the opening 1009, which can be opened and closed with a shutter 1020.

The opening 1009, when opened by moving the shutter 1020, enables access of the read head 1010 on the head actuator 1006 to the recording medium 1008 as above-mentioned.

FIG. 13A shows an opening and closing system of a conventional shutter 1020, and FIG. 13B shows an opening and closing system of another shutter 1020.

In FIG. 13A, a short shutter 1020 is disposed relative to the opening 1009 of the upper shell 1015 and the lower shell 1016, a part 1020A of the shutter 1020 is located on the outside of the upper shell 1015 and the lower shell 1016, and another part 1020B of the shutter 1020 is located on the inside of the upper shell 1015 and the lower shell 1016. The shutter 1020 can be opened and closed in the direction of arrow 1031 by an actuator 1030 located on the outside of the disk cartridge 1003.

In FIG. 13B, when a pressing member 1035 provided at the upper shell 1015 is pressed in the direction of arrow 1036, a link mechanism 1037 is operated, whereby the shutter 1020 can be opened in the direction of arrow 1031.

However, in the system shown in FIG. 13A, the length of the overlapping portions 1040 between the parts 1020A and 1020B of the shutter 1020 and the upper shell 1015 and the lower shell 1016 is small, so that gaps are liable to be generated. Therefore, dust or gas in the atmosphere surrounding the cartridge may penetrate to the recording medium 1008 in the disk cartridge through the gaps, thereby contaminating the recording medium 1008.

In addition, in the system shown in FIG. 13B, there are not only the same problem as in the system shown in FIG. 13A but also the following problem. Namely, since a gap 1050 is generated between the pressing member 1035 of the link mechanism 1037 and the upper shell 1015, the pressing member 1035 would be exposed to the exterior of the disk cartridge. Therefore, the gap 1050 becomes a large opening when the pressing member 1035 is operated in the direction of arrow 1036, so that the above-mentioned dusk or gas may penetrate through the opening, to contaminate the recording medium.

Besides, FIGS. 14A and 14B show the shutter 1020 and the opening 1009 in relation to the upper shell 1015 and the lower shell 1016. The shutter 1020 is slightly larger than the opening 1009 in size, and the portions where the shutter 1020 overlaps with the inside of the upper shell 1015 and the lower shell 1016 are made to be the so-called labyrinth structure portions 1060.

However, the shutter 1020 and the upper shell 1015 and the lower shell 1016 constituting the labyrinth structure portions 1060 are so constructed that the size of the overlapping portions 1070 thereof is very small, for example, about 0.5 to 1 mm. Therefore, again, dust or gas in the atmosphere would penetrate to the side of the recording medium 1018 through the labyrinth structure portions 1060 having the small size. Moreover, due to scattering of accuracy such as the size tolerances and shape accuracies of the upper shell 1015, the lower shell 1016 and the shutter 1020, gaps would be generated at the labyrinth structure portions 1060, so that, particularly, fine particulate dust or gas would penetrate into the disk cartridge 1003 through the labyrinth structure portions 1060 without being shielded.

FIG. 15 shows the upper shell 1015, the lower shell 1016, a recording medium 1018 and a center core 1080. The center core 1080 is provided for preventing the recording medium 1018 from chattering in the disk cartridge 1003 when the user carries or handles the disk cartridge.

It is important that the center core 1080, by engaging with a spindle motor, stably prevent the generation of gaps between the center core 1080 and the shells, thereby protecting the recording medium 1018 inside.

Conventionally, a system has been generally adopted in which the center core 1080 is restrained relative to the inside of the lower shell 1016 only in one direction of arrow N. In this system, however, since the recording medium 1018 receives external forces in various directions during carrying or handling of the disk cartridge, it has been impossible to prevent the generation of chattering of the recording medium 1018 or the generation of a gap 1081 between the center core 1080 and the lower shell 1016; as a result, there has been the problem of breakage of the recording medium 1018 or contamination of the recording medium 1018.

The present invention has been made for solving the above-mentioned problems. Accordingly, it is an object of the present invention to provide a disk cartridge which has a labyrinth structure for isolating a recording medium and the exterior thereof from each other, whereby penetration of dust or gas can be sufficiently prevented and chattering of the recording medium can be prevented, and a disk drive apparatus for use with the disk cartridge.

SUMMARY OF THE INVENTION

In accordance with one aspect of the present invention, there is provided a disk cartridge for containing a disk form recording medium therein, including an opening through which a head for reading or writing information recorded on the recording medium is inserted, wherein the disk cartridge includes a first shell and a second shell disposed opposite to the first shell, for constituting therebetween a containing space for containing the recording medium, and a rotor disposed in the containing space so as to be rotatable around the center of rotation of the recording medium, and one of the first shell, the second shell, and the rotor is provided with a first wall, and another of the first shell, the second shell, and the rotor is provided with a second wall.

In accordance with another aspect of the present invention, there is provided a disk drive apparatus into which a disk cartridge containing a disk form recording medium therein is inserted and which is for reading or writing information recorded on the recording medium, wherein the disk cartridge includes a first shell and a second shell disposed opposite to the first shell, for constituting therebetween a containing space for containing the recording medium, and a rotor disposed in the containing space so as to be rotatable around the center of rotation of the recording medium, and one of the first shell, the second shell, and the rotor is provided with a first wall, while another of the first shell, the second shell, and the rotor is provided with a second wall.

The first wall and the second wall may constitute a labyrinth structure. The first wall and the second wall may be provided along the circumferential direction of the recording medium. The first wall may be provided with a first opening for constituting the opening, while the second wall may be provided with a second opening for constituting the opening. One of the first shell, the second shell, and the rotor may be provided with a third wall. The first wall may be projected upwards or downwards in a direction parallel to the axis of rotation of the rotor, and the second wall may be projected in a direction parallel to the axis of rotation of the rotor and opposite to the direction in which the first wall is provided.

The disk cartridge may include a center core for holding the recording medium, and a hole provided in the first shell for putting in and out a chucking portion for chucking the recording medium, and the rotation of the recording medium may be restrained relative to the first shell when the opening is closed and the hole is shut up with the center core. The disk cartridge may include a shut-up mechanism for restraining the rotation of the recording medium relative to the first shell. The shut-up mechanism may include a first cam formed in the rotor, and a cam follower capable of linear movement along the first cam of the rotor.

The first cam may include a first guide portion and a second guide portion which are disposed at symmetric positions of the rotor with respect to the center of rotation of the recording medium, while the cam follower may include a first slide member linearly moved in the radial direction by the first guide portion, and a second slide member linearly moved in the radial direction of the recording medium by the second guide portion.

The disk cartridge may include a second cam pressed by the cam follower to restrain the rotation of the recording medium relative to the first shell. The second cam may include a conical portion pressed by the first slider member and the second slider member put into linear movement in the radial direction of the recording medium. The first guide portion of the first cam may include a first biasing portion for pressing the first slide member against the second cam for restraining the rotation of the recording medium relative to the first shell, while the second guide portion of the first cam may include a second biasing portion for pressing the second slide member against the second cam.

The disk cartridge may include a shutter for opening and closing the hole in the first shell, and a shutter-moving portion for moving the shutter. The shutter-moving portion may include a pinion provided at the outer circumference of the rotor, and a rack capable of linear movement in engagement with the pinion.

According to the present invention, a long labyrinth structure portion with a two-layer wall structure or a three-layer wall structure can be formed in the circumferential direction. When the head in/out opening is closed, the labyrinth structure portion eliminates the possibility of generation of gaps at portions other than the head in/out opening, whereby fine particulate dust and gas can be shut off sufficiently and prevention of contamination of the recording medium can be remarkably enhanced.

In addition, according to the present invention, where the head in/out opening is closed and access to the recording medium by the head is not conducted, the shut-up mechanism shuts up the hole in the second shell, and restrains the rotation of the recording medium relative to the second shell. Therefore, penetration of dust or gas into the disk cartridge via the hole can be prevented, and chattering of the recording medium under external forces such as vibration and impact during carrying or handling of the disk cartridge can be prevented perfectly. Thus, the recording medium can be protected from breakage and contamination.

The above and other objects, features and advantages of the present invention will become apparent from the following description and appended claims, taken in conjunction with the accompanying drawings which show by way of example some preferred embodiments of the invention.

BRIEF DESCRIPTION OF THE DRAWINGS

FIG. 12 is a perspective view of a removable hard disk drive apparatus and a disk cartridge according to the related art.

DESCRIPTION OF THE PREFERRED EMBODIMENTS

Now, preferred embodiments of the present invention will be described in detail below, referring to the accompanying drawings.

The embodiments are preferred specific examples of the present invention and, therefore, various preferable technical limitations are applied to the embodiments; however, in the following description, the scope of the present invention is not limited to the embodiments, unless a description of specifically limiting the invention is made.

Figure 1:
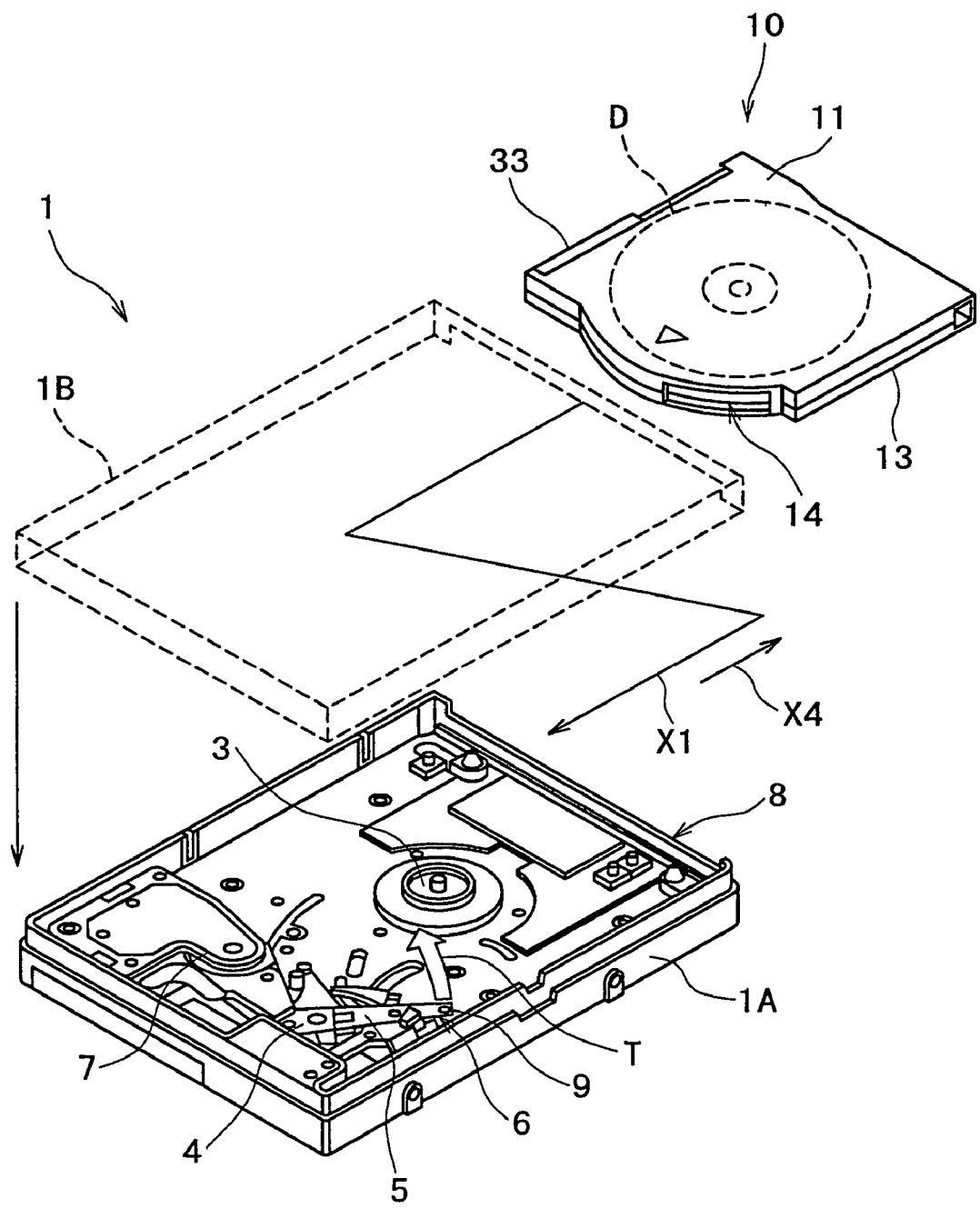
FIG. 1 is a perspective view of an example of a disk cartridge and a removable hard disk drive apparatus including the disk cartridge, according to the present invention.

FIG. 1 shows a preferred embodiment of a recording medium drive including a disk cartridge according to the present invention. The recording medium drive shown in FIG. 1 is a so-called removable hard disk drive apparatus (R-HDD). The removable hard disk drive apparatus is a kind of removable disk drive apparatus, and the removable hard disk drive apparatus 1 is so constructed that a disk cartridge 10 can be mounted therein and dismounted therefrom.

The removable hard disk drive apparatus 1 can be incorporated or mounted particularly in a small-type electronic apparatus, for example, a notebook-type personal computer or a PDA (personal digital assistant). Such a computer, PDA and the like are examples of the electronic apparatus including the removable hard disk drive apparatus 1 according to the present invention.

The removable hard disk drive apparatus 1 will first be described.

The removable hard disk drive apparatus 1 shown in FIG. 1 includes a casing 1A, a head arm 4, a slider 6, a voice coil motor 7 and a spindle motor 3. The casing 1A can be closed with a cover 1B, and the cover 1B and the casing 1A are provided with an insertion port 8 or the disk cartridge 10. The disk cartridge 10 can be inserted in a direction X1 or taken out in a direction X4, relative to the insertion port 8.

The head arm 4 includes a suspension 5, and the slider 6 is provided at the tip end of the suspension 5. The slider 6 includes a head (magnetic head) 9. The head arm 4 can be put into a seek motion in a direction T, by operating the voice coil motor 7 provided as a head actuator.

When the head arm 4 performs the seek motion in the direction T, the head slider 6 is brought into and out of the disk cartridge 10 through a head in/out opening 14 of the disk cartridge 10, whereby the head 9 of the head slider 6 can make access to a recording medium D in the disk cartridge 10.

By this access, information is magnetically recorded on the disk form recording medium D or information recorded on the recording medium D is reproduced.

The spindle motor 3 is a motor for chucking the disk form recording medium D in the disk cartridge 10 and continuously rotating the recording medium D.

Figure 2:
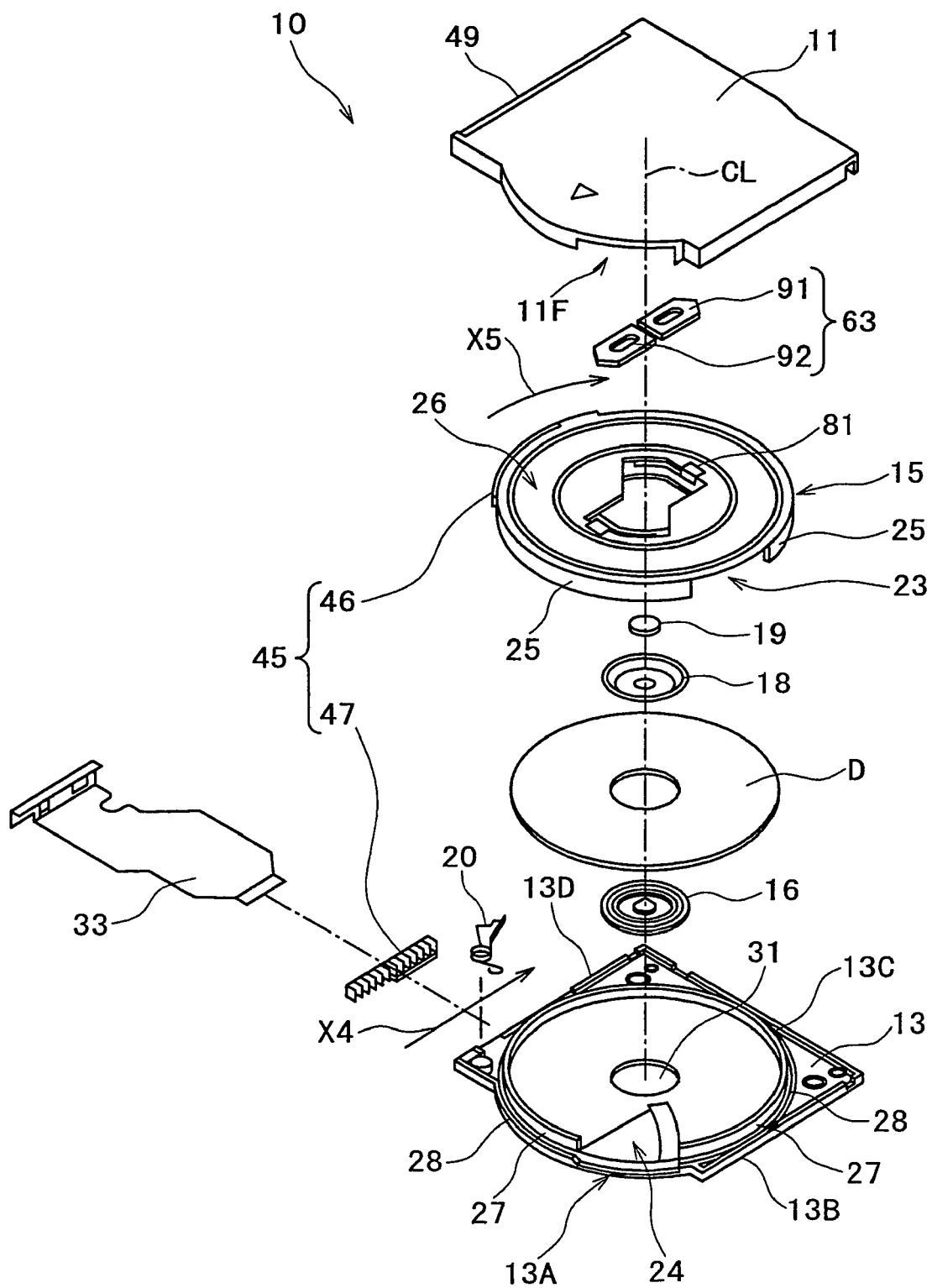
FIG. 2 is an exploded perspective view of the disk cartridge of FIG. 1.
Figure 3:
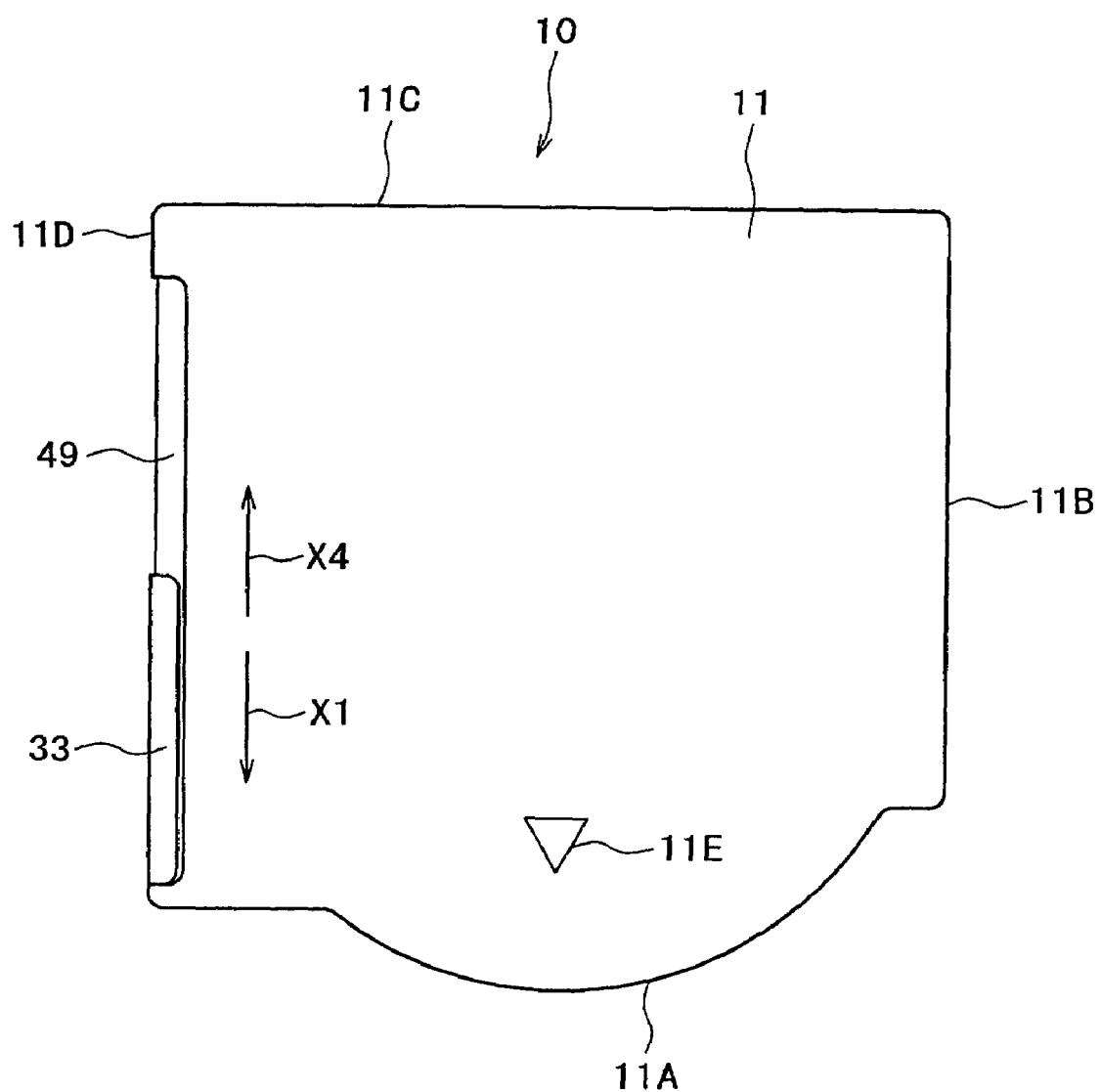
FIG. 3 is a plan view of the disk cartridge.
Figure 4:
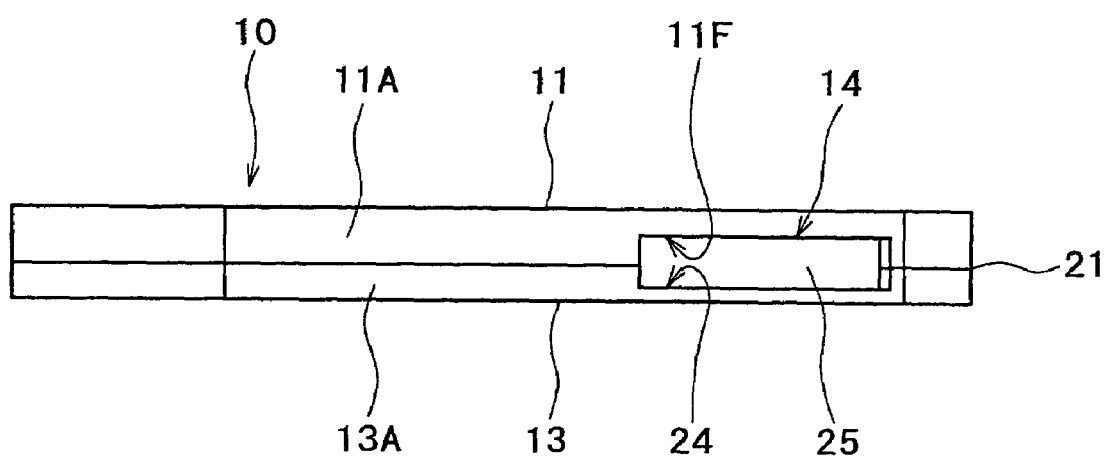
FIG. 4 is a front view of the disk cartridge.

FIG. 2 is an exploded perspective view of the disk cartridge 10 shown in FIG. 1. FIG. 3 is a plan view of the disk cartridge 10, and FIG. 4 is a front view of the disk cartridge 10. Referring to FIGS. 1 to 4, the structure of the disk cartridge 10 will be described.

As shown in FIGS. 1 and 2, the disk cartridge 10 includes an upper shell 11 and a lower shell 13.

The upper shell 11 corresponds to the first shell, and the lower shell 13 corresponds to the second shell. The upper shell 11 and the lower shell 13 are formed of a plastic selected, for example, from ABS (acrylonitrile-butadiene-styrene), PC (polycarbonate), PBT (polybutylene terephthalate), PPS (polyphenylene sulfide), etc.

As shown in FIG. 3, the upper shell 11 is provided on its upper surface with an arrow 11E indicating the direction of insertion of the disk cartridge 10 into the insertion port 8 shown in FIG. 1. The upper shell 11 and the lower shell 13 are substantially rectangular or square in shape. As shown in FIG. 2, a rotor 15, the disk form recording medium D, a center core 16, a cam follower 63, a coil spring 18, a core nut 19, a shutter lock 20 and the like are contained in a containing space formed inside the upper shell 11 and the lower shell 13.

As shown in FIG. 3, the upper shell 11 includes an arcuate portion 11A at a part thereof. The arcuate portion 11A is a portion near the arrow 11E. Side portions 11B, 11C, and 11D, which are portions other than the arcuate portion 11A of the upper shell 11, are rectilinear in shape. Similarly, the lower shell 13 includes an arcuate portion 13A and three side portions 13B, 13C, and 13D, as shown in FIG. 2. The arcuate portion 13A of the lower shell 13 corresponds to the arcuate portion 11A of the upper shell 11 shown in FIG. 3.

As shown in FIG. 4, the upper shell 11 and the lower sell 13 are in close contact with each other and are connected to each other at a connection portion 21.

As shown in FIGS. 4 and 2, the upper shell 11 includes an upper shell opening 11F. As shown in FIG. 2, the rotor 15 includes a first opening 23, and the lower shell 13 includes a second opening 24. The upper shell opening 11F, the first opening 23 and the second opening 24 can form the head in/out opening 14. The head in/out opening 14 can be shut up with a first wall 25 of the rotor 15 as shown in FIG. 4, by rotating the rotor 15 shown in FIG. 2 in a direction X5 with the rotational center CL as a center.

The head in/out opening 14 shown in FIG. 4 is an opening for bringing the head 9 of the slider 6 of the head arm 4 shown in FIG. 1 into and out of the disk cartridge 10, and the head 9 having been brought into the inside of the disk cartridge 10 can be put into the seek motion along the direction T, namely, substantially along the radial direction of the recording medium D.

Returning to FIG. 2, the rotor 15 is a disk form member, and is contained in the containing space formed inside the upper shell 11 and the lower shell 13. The rotor 15 is located between the upper shell 11 and the recording medium D, and covers the recording medium D. The recording medium D is located between the rotor 15 and the lower shell 13.

The center core 16 is located between the recording medium D and the lower shell 13. The core nut 19 and the coil spring 18 are located between the inside surface of the rotor 15 and the recording medium D. The cam follower 63 is located substantially on the same plane as the rotor 15. The rotor 15 can be rotated relative to the lower shell 13, with the rotational center CL as a center.

Here, the structure of the rotor 15 will be described.

As shown in FIG. 2, the rotor 15 is a disk form member including the first wall 25. The first wall 25 is projected toward the side of the lower shell 13 in parallel to the direction of the rotational center CL, relative to a flat surface portion 26 of the rotor 15. The first wall 25 is formed in the circumferential direction, over substantially the whole circumference of the rotor 15. A part of the first wall 25 is cut out, to form the first opening 23 that is rectangular in shape.

The length of the first opening 23 in the circumferential direction is substantially equal to the length of the upper shell opening 11F in the upper shell 11 in the circumferential direction. The first wall 25 is referred to also as the vertical wall of the rotor 15.

The lower shell 13 shown in FIG. 2 includes a second wall 27 on the inside and a third wall 28 on the outside.

The second wall 27 is formed at such a position as overlap with the inside of the first wall 25 of the rotor 15, and is formed over substantially the whole circumference with the rotational center CL as a center. A part of the second wall 27 is cut out, to form the second opening 24. The length of the second opening 24 in the circumferential direction is substantially equal to the lengths of the first opening 23 and the upper shell opening 11F in the circumferential direction. The second wall 27 is projected toward the side of the rotor 15 in parallel to the rotational center CL.

The third wall 28 is located on the outside of the second wall 27, and on the outside of the first wall 25 of the rotor 15. The length of the third wall 28 in the circumferential direction is smaller than that of the second wall 27. The third wall 28 is projected toward the side of the rotor 15 with the rotational center CL as a center. The inner circumferential surface of the third wall 28 overlaps with the outer circumferential surface of the first wall 25 of the rotor 15.

Figure 8:
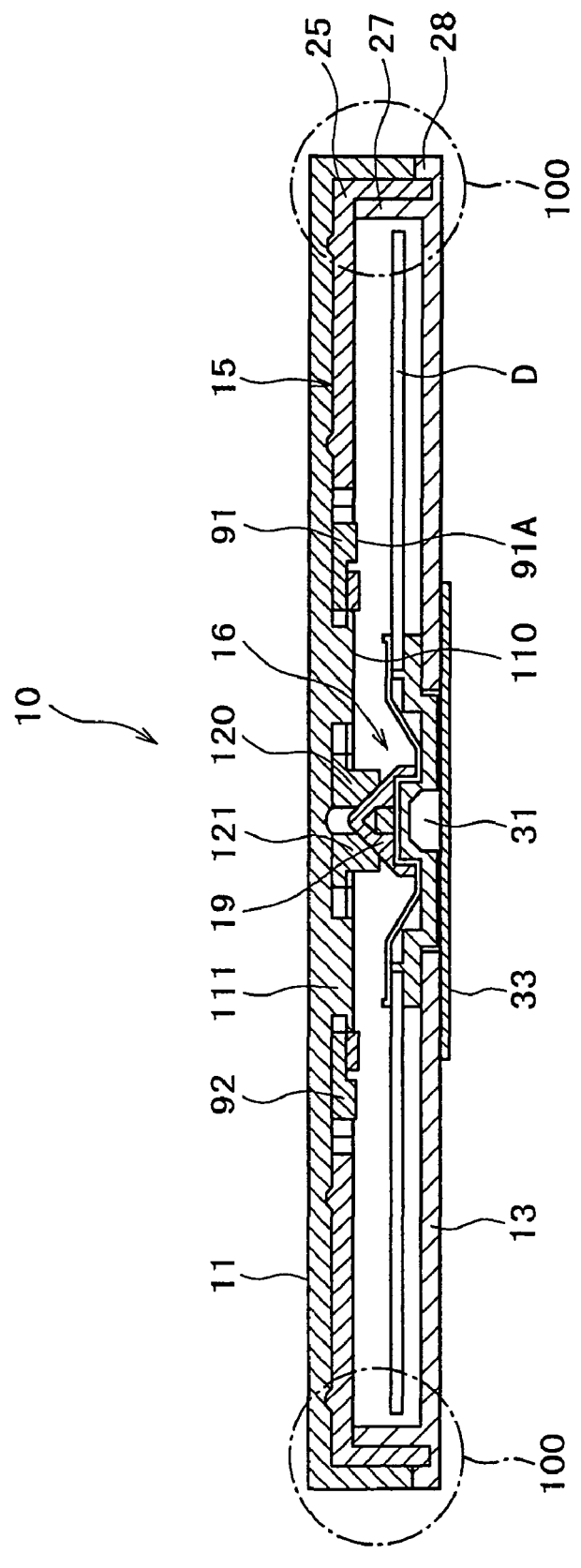
FIG. 8 shows a sectional structure along line A—A of FIG. 5, in the condition where the disk cartridge is dismounted from the removable hard disk drive apparatus.
Figure 9:
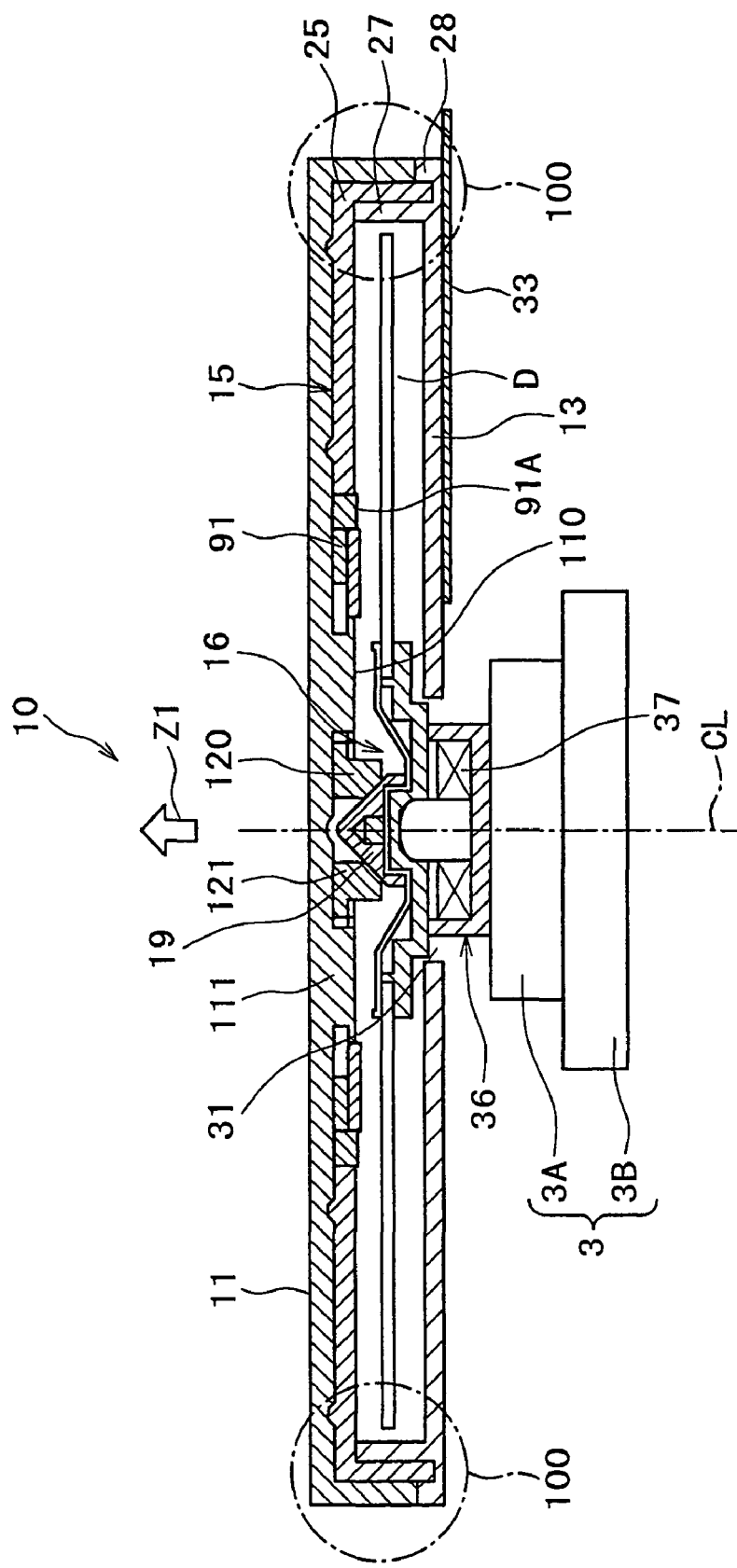
FIG. 9 shows a sectional structure example along line B—B of FIG. 6, in the condition where the disk cartridge is mounted in the removable hard disk drive apparatus.

FIGS. 8 and 9 show the overlapping portion of the first wall 25 of the rotor 15 and the second wall 27 and the third wall 28 of the lower shell 13 mentioned above. The first wall 25, the second wall 27 and the third wall 28 constitute a so-called labyrinth structure portion 100.

Figure 7:
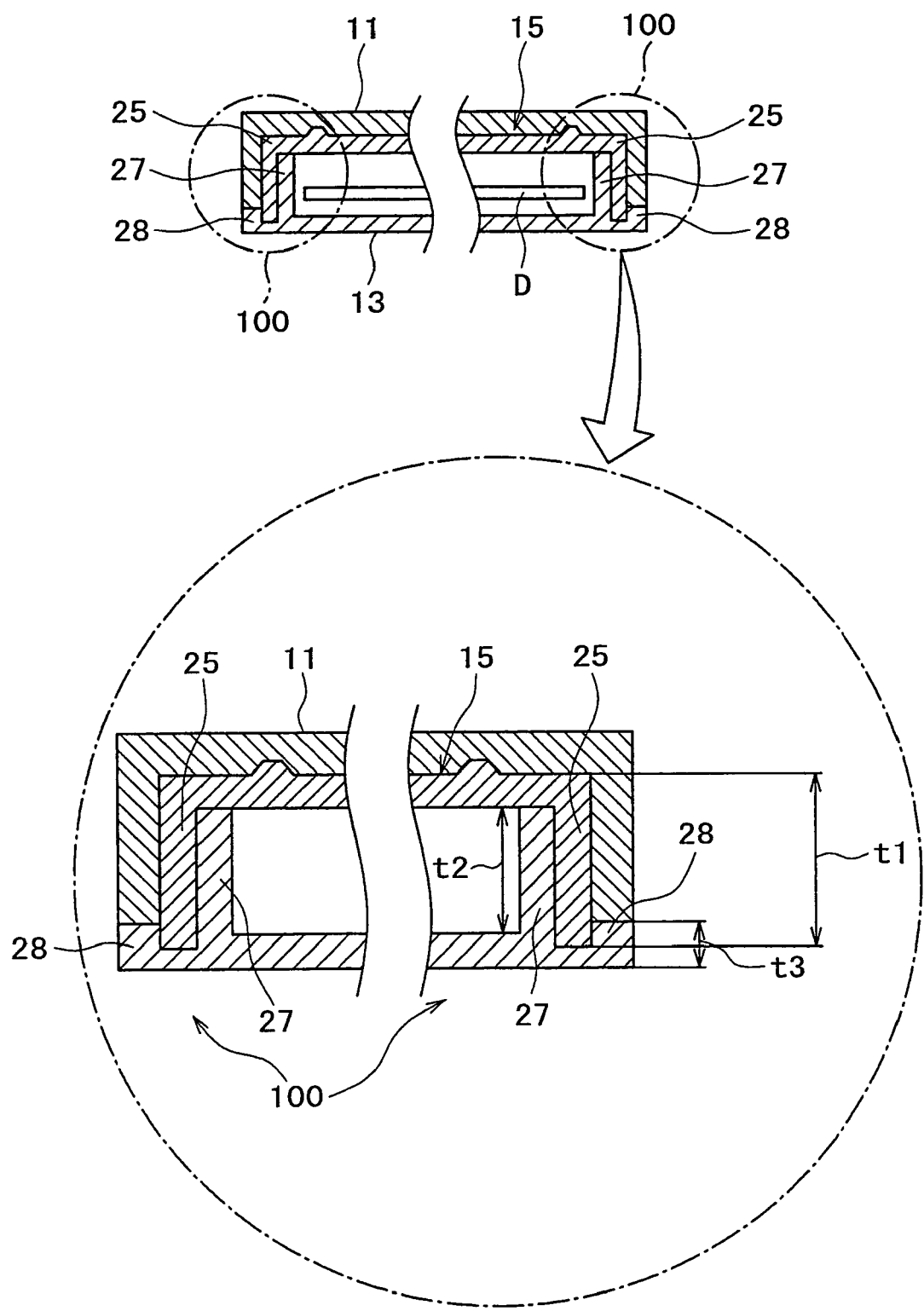
FIG. 7 shows a labyrinth structure portion of the disk cartridge.

FIG. 7 shows the labyrinth structure portion 100 in a more enlarged view. The height t1 of the first wall 25 in the direction of the rotational center CL is set to be greater than the height t2 of the second wall 27, and the height t2 of the second wall 27 is set to be greater than the height t3 of the third wall 28. The upper shell 11 is laid on the third wall 28.

Thus, by using the first wall 25, the second wall 27 and the third wall 28, the labyrinth structure portion 100 with a so-called three-layer wall structure is constituted over substantially the whole circumference of the disk cartridge 10. Since the disk cartridge 10 is provided with such a long labyrinth structure portion 100, dust and gas in the atmosphere surrounding the disk cartridge 10 cannot penetrate to the recording medium D inside due to the presence of the labyrinth structure portion 100. Thus, fine particulate dust and gas in the atmosphere surrounding the disk cartridge 10 are sufficiently shielded from the recording medium, whereby prevention of contamination of the recording medium is remarkably enhanced.

While the structure of the labyrinth structure portion 100 has been described above, the labyrinth structure portion 100 with a two-layer wall structure may also be adopted which includes only the first wall 25 and the second wall 27 and does not include the third wall 28.

As shown in FIG. 2, the lower shell 13 is provided in its center with a circular hole 31. The hole 31 is formed with the rotational center CL as a center. In correspondence with the hole 31, the center core 16 is disposed between the recording medium D and the inside surface of the lower shell 13.

As shown in FIGS. 8 and 9, the center core 16 is disposed between the upper shell 11, the rotor 15 and the lower shell 13. FIG. 8 shows the condition where the hole 31 is shut up with the center core 16 and the shutter 33.

On the other hand, in FIG. 9, the shutter 33 has been moved sideways, and the center core 16 has also been moved by pressing in a direction Z1. The direction Z1 is the direction of the rotational center CL.

Accordingly, the hole 31 is open, a chucking portion 36 of the spindle motor 3 penetrates into the hole 31, and the chucking portion 36 is removably magnetically attracting and holding the center core 16 by use of a chucking magnet 37.

The chucking portion 36 is mounted on a rotor 3A of the spindle motor. The spindle motor 3 is a motor in which the rotor 3A can be continuously rotated relative to a stator 3B, with the rotational center CL as a center.

Figure 10:
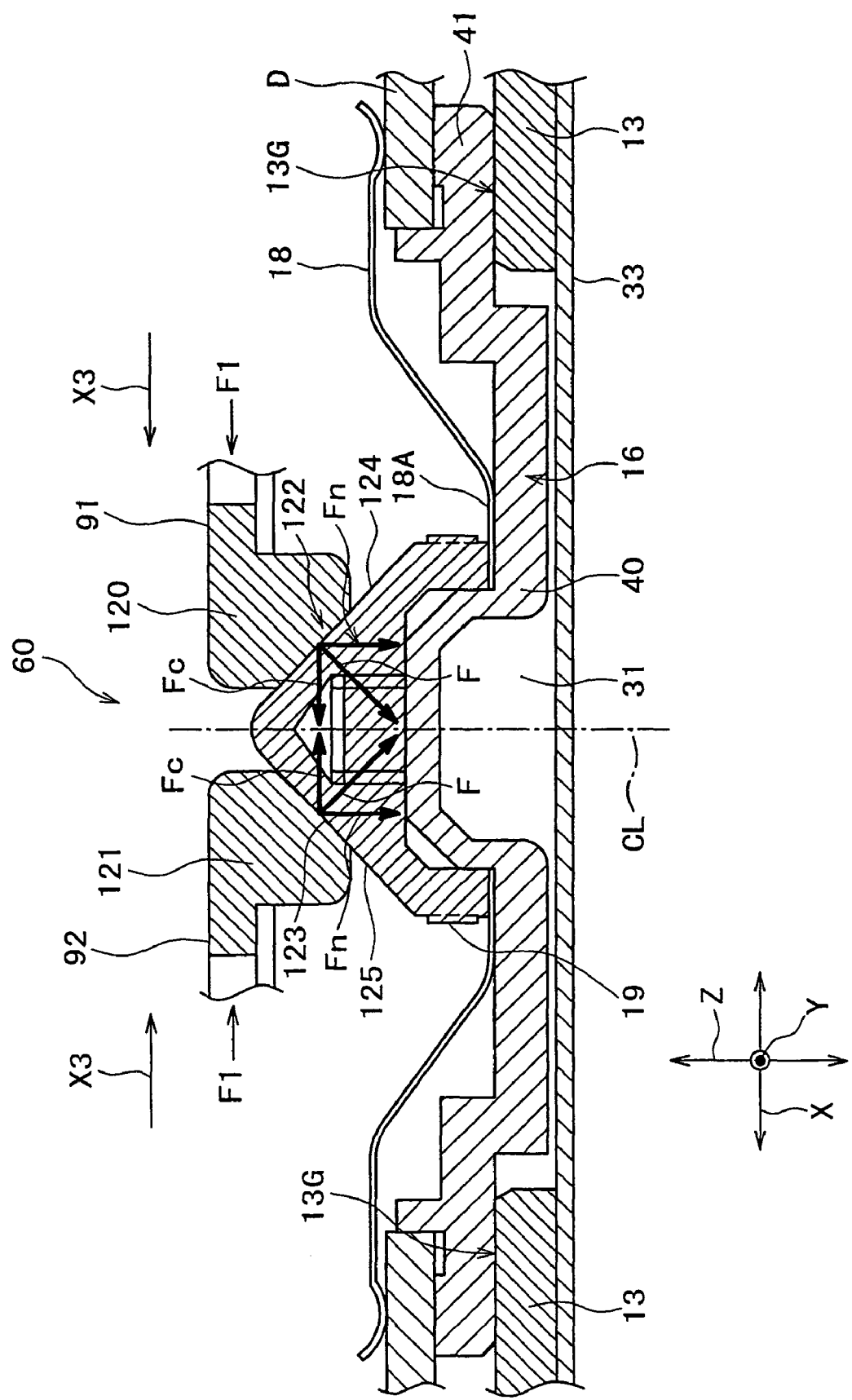
FIG. 10 shows the condition where a center core shuts up a hole of the lower shell by a shut-up mechanism and restrains the position of the recording medium.

FIG. 10 shows the condition of the shutter 33 and the center core 16 shown in FIG. 8, in a more enlarged view.

The shutter 33 is shutting up the hole 31. Namely, the condition of the disk cartridge 10 shown in FIGS. 8 and 10 is the condition where the disk cartridge 10 has been dismounted from the removable hard disk drive apparatus 1, and is the condition during carrying or handling of the disk cartridge 10. Since the shutter 33 and the center core 16 are shutting up the hole 31 in the lower shell 13 completely, penetration of gas or dust from the atmosphere into the inside through the hole 31 is obviated, and contamination of the recording medium D can be prevented.

The center core 16 in FIG. 10 includes a central portion 40 and a peripheral portion 41. The core nut 19 is fixed to the central portion 40 by, for example, press fit. The annular peripheral portion 41 is formed integrally with the periphery of the central portion 40. The peripheral portion 41 abuts against a peripheral portion 13G of the hole 31 in the lower shell 13, whereby the hole 31 can be shut up. The peripheral portion 41 fixes a central portion of the recording medium D by use of a coil spring 18. A central portion 18A of the coil spring 18 is fixed to the central portion 40 by use of the core nut 19. The core nut 19 is a substantially conical member and is formed, for example, of a plastic.

Here, referring to FIGS. 2, 5 and 6, the above-mentioned shutter 33 and a shutter-moving portion 45 for moving the shutter 33 will be described.

Figure 5:
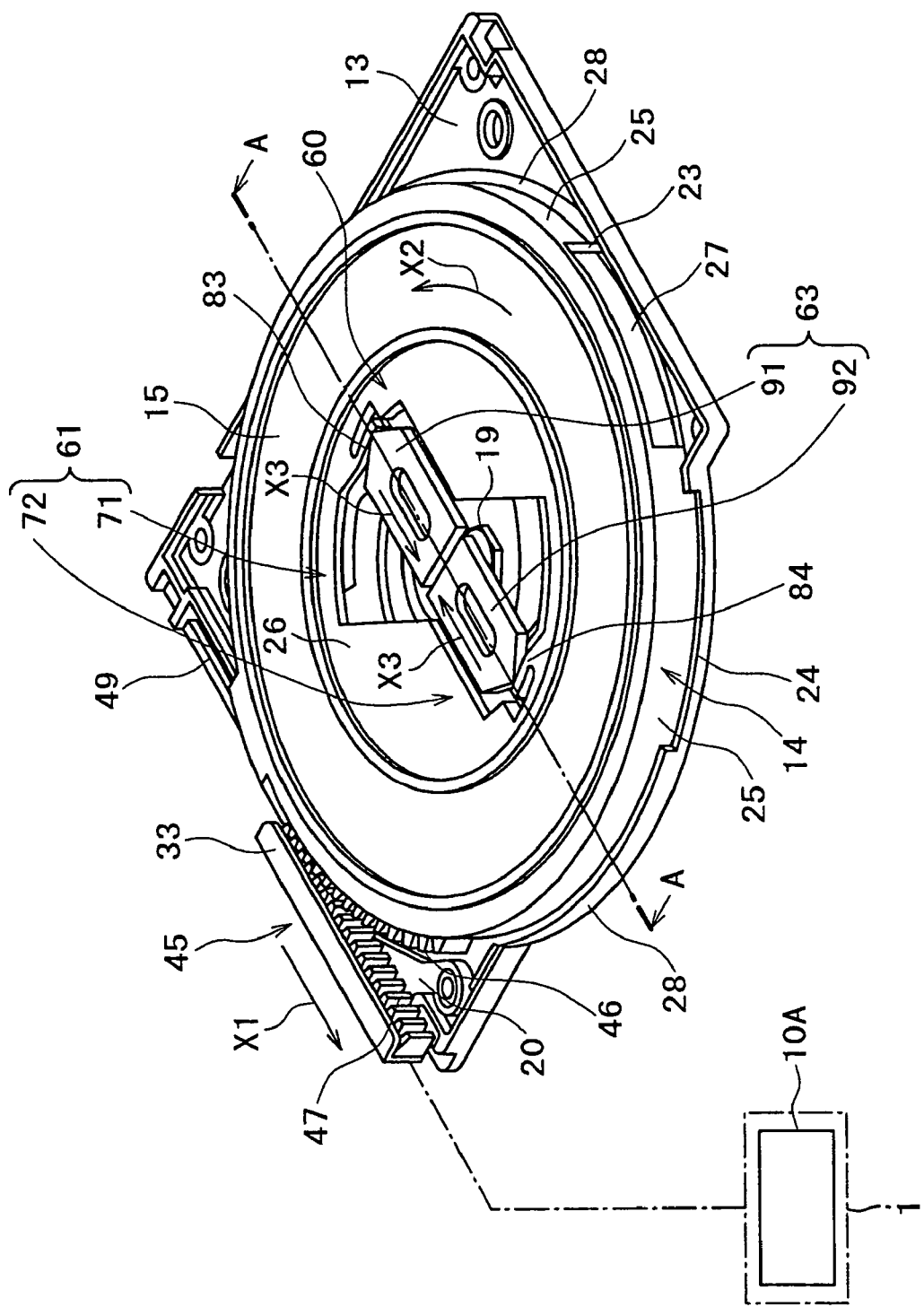
FIG. 5 is a perspective view of a rotor and a lower shell, showing the condition where the disk cartridge is dismounted from the removable hard disk drive apparatus.
Figure 6:
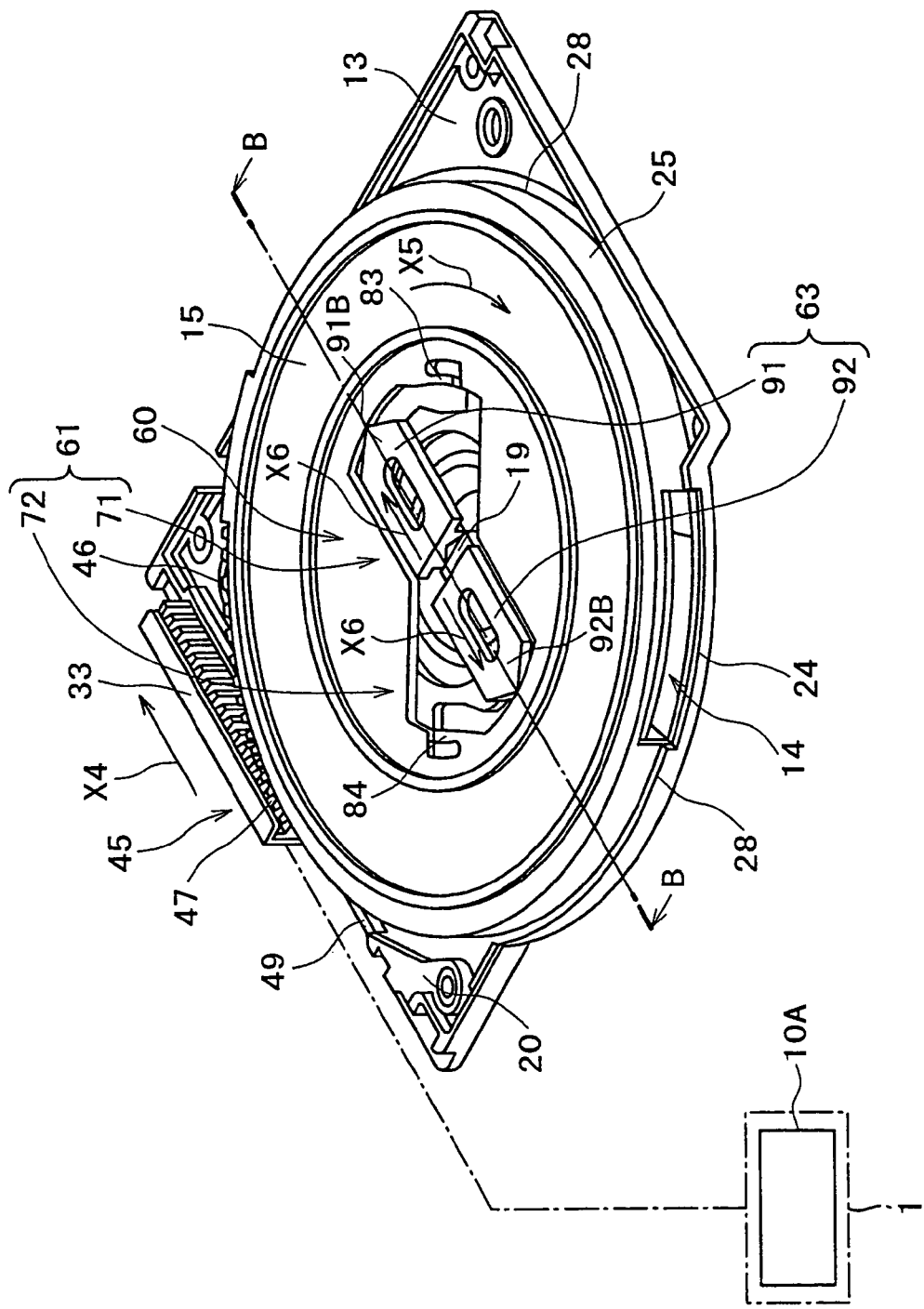
FIG. 6 is a perspective view of the rotor and the lower shell, showing the condition where the disk cartridge is mounted in the removable hard disk drive apparatus.

FIG. 8 is an example of the sectional structure along line A—A of FIG. 5, and FIG. 9 is an example of the sectional structure along line B—B of FIG. 6.

The shutter-moving portion 45 has the function of sliding the shutter 33 in the direction X4 in FIG. 2 and the function of rotating the rotor 15 by a predetermined angle in the direction X5.

The shutter-moving portion 45 includes a pinion 46 and a rack 47. The pinion 46 is formed over a predetermined angle along the outer circumferential surface of the rotor 15, namely, along the first wall 25. The rack 47 is for engaging with the pinion 46, and is fixed to the shutter 47. The shutter 33 is moved along the direction X4, and the rack 47 can perform a linear movement in the direction X4 in FIG. 6 or in the direction X1 in FIG. 5 along a guide groove 49 in the lower shell 13 as shown in FIGS. 5 and 6.

In FIG. 5, the shutter 33 and the rack 47 are located in the direction X1, and the shutter 33 is positioned in an initial position. On the other hand, in FIG. 6, the shutter 33 and the rack 47 are linearly moved in the direction X4. The initial condition shown in FIG. 5 corresponds to FIG. 8, whereas the final condition shown in FIG. 6 corresponds to the condition of FIG. 9.

In FIGS. 5 and 8, the disk cartridge 10 has been taken out of the removable hard disk drive apparatus 1, and is in the condition of being carried out handled, where the recording medium D is fixed for preventing rotation thereof, and the hole 31 in the lower shell 13 is shut up. On the other hand, in FIGS. 6 and 9, the disk cartridge 10 is mounted in the removable hard disk drive apparatus 1 shown in FIG. 1, and the recording medium D can be rotated by the spindle motor 3.

When the shutter 33 and the rack 47 shown in FIG. 5 are linearly moved in the direction X4 into the condition shown in FIG. 9, the rotor 15 can be rotated by about 45° in the direction X5 because the rack 47 and the pinion 46 are in engagement with each other as shown in FIG. 6. In this condition, the head in/out opening 14 is open, so that the head can access the recording medium.

When the shutter 33 and the rack 47 shown in FIG. 6 are linearly moved in the direction X1 as shown in FIG. 5, the rotor 15 is rotated back in the direction X2. Accordingly, the head in/out opening 14 is shut up with the first wall 25 of the rotor 15.

In the condition where the disk cartridge has been taken out of the removable hard disk drive apparatus 1 as shown in FIG. 5, a shutter lock 20 is in engagement with the rack 47, so that the rack 47 cannot be moved. The shutter lock 20 is a safety device for preventing the shutter 33 from being carelessly operated at times other than the time of inserting the disk cartridge 10 into the removable hard disk drive apparatus 1 shown in FIG. 1. The shutter 33 and the rack 47 are fixed, for example, by fusion bonding.

Next, the shut-up mechanism 60 provided in the rotor 15 will be described referring to FIGS. 5, 6 and 10.

The shut-up mechanism 60 is for shutting up the hole 31 in the lower shell 13 with the center core 16 as shown in FIG. 10 and for restraining the rotation of the recording medium D relative to the lower shell 13.

The shut-up mechanism 60 includes a first cam 61, a cam follower 63, and the core nut 19 as a second cam, as shown in FIG. 5. The first cam 61 of the shut-up mechanism 60 shown in FIG. 5 is formed in the flat surface portion 26 of the rotor 15. The first cam 61 includes a first guide portion 71 and a second guide portion 72. The first guide portion 71 and the second guide portion 72 are shaped as shown in FIG. 11, and are 180° oppositely symmetric with each other.

Figure 11:
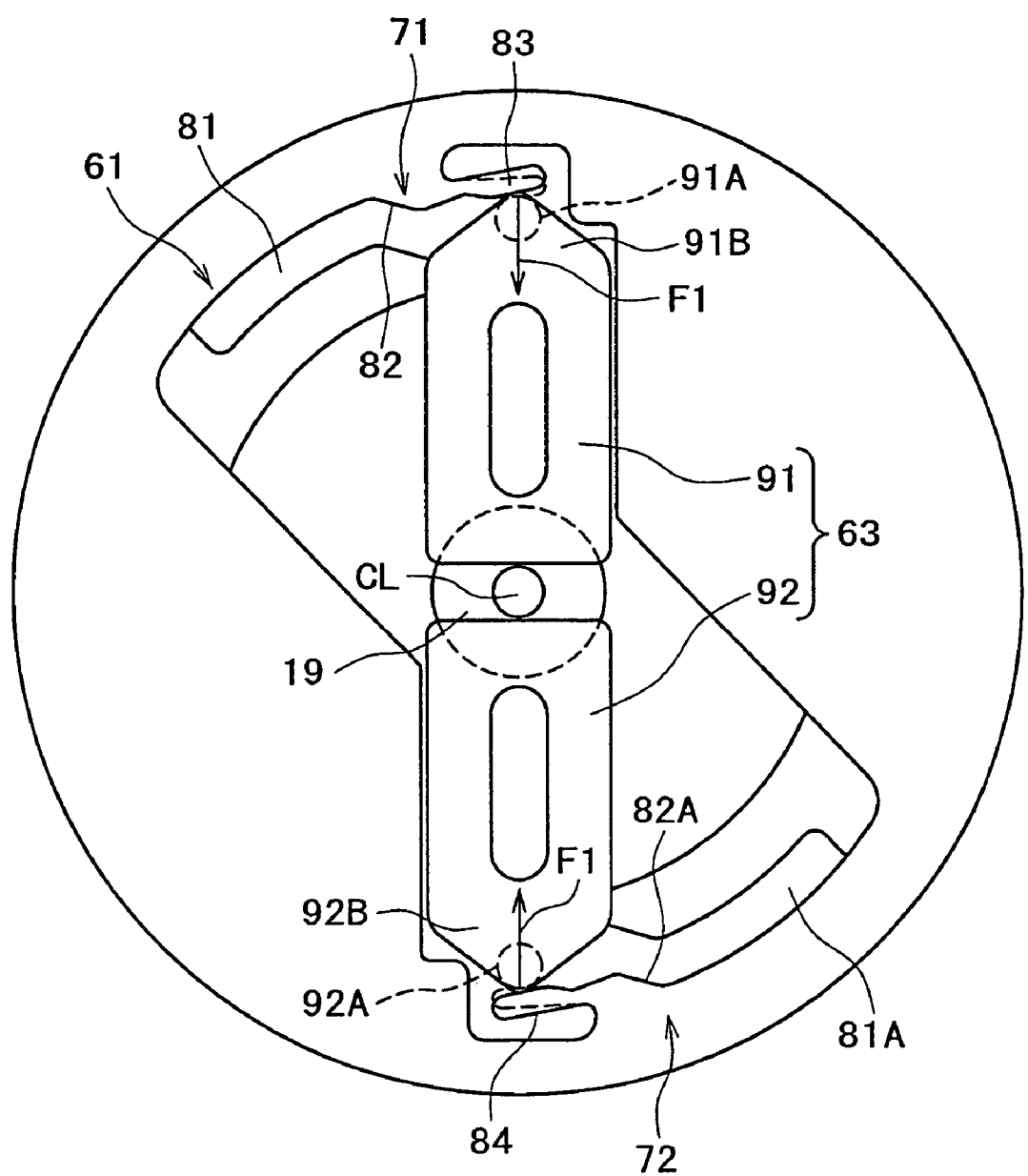
FIG. 11 shows the condition where a first slide member and a second slide member abut against biasing portions.
Figure 13A:
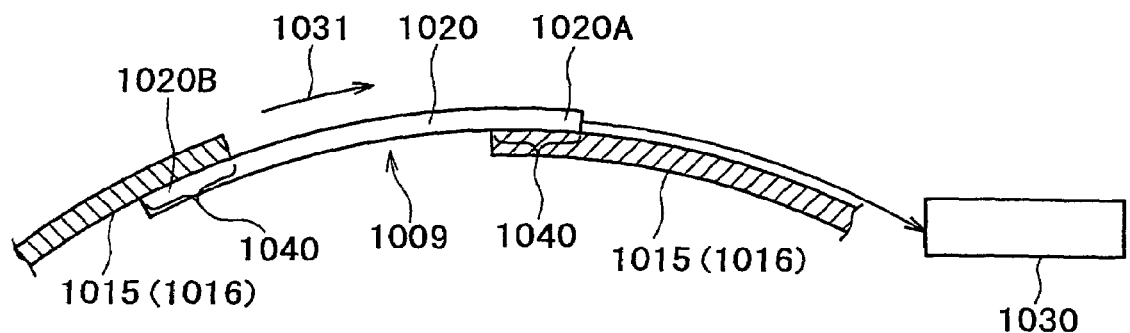
FIGS. 13A and 13B show an example of the structure of the disk cartridge and the shutter according to the related art.
Figure 13B:
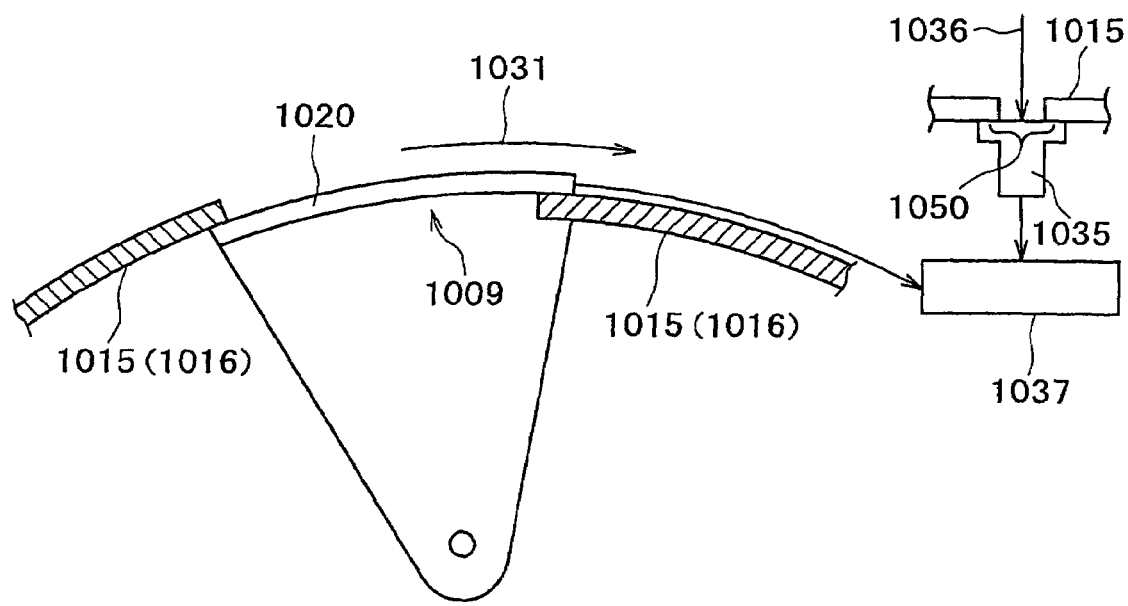
Figure 14A:
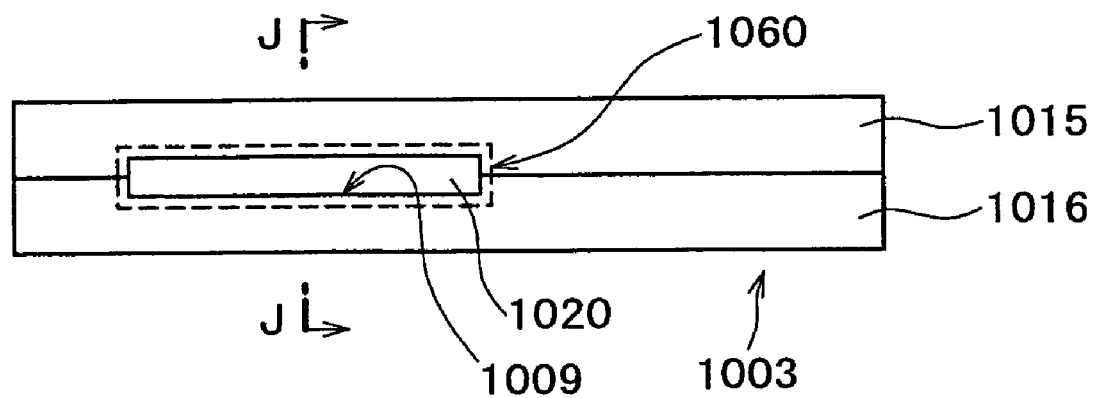
FIGS. 14A and 14B show a labyrinth structure portion at an opening according to the related art.
Figure 14B:
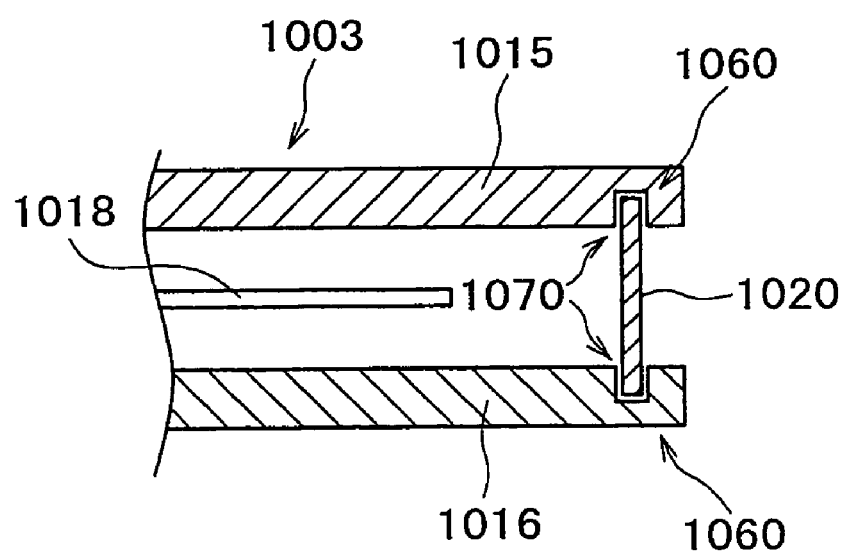
Figure 15:
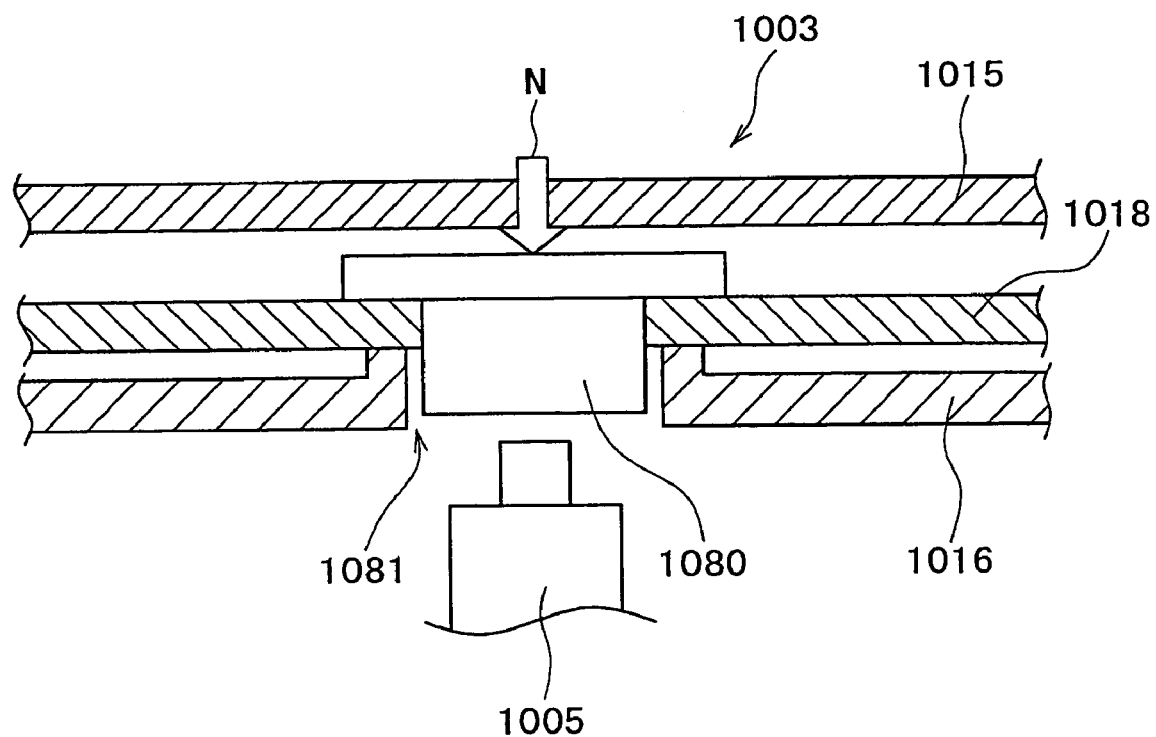
FIG. 15 shows the condition of fixing the recording medium in the disk cartridge according to the related art.

As shown in FIG. 11, the first guide portion 71 includes a cam surface 82, which includes a cam groove 81. The cam surface 82 includes a first biasing portion 83 at a tip end portion thereof. Similarly, the second guide portion 72 includes a cam surface 82A, which includes a cam groove 81A. The cam surface 82A includes a second biasing portion 84.

The cam grooves 81 and 81A are formed along the circumferential direction, and the first biasing portion 83 and the second biasing portion 84 are projected along circumferential direction. Both the first biasing portion 83 and the second biasing portion 84 are cantilever type projections. The cam groove 81 is a groove for guiding a pin 91A of a first slide member 91 which will be described later, and the cam surface 82 guides the pin 91A. The pin 91A is designed to abut against the first biasing portion 83. Similarly, the cam groove 81A is a groove for guiding a pin 92A of a second slide member 92, and the cam surface 82A guides the pin 92A. The pin 92A is designed to abut against the second biasing portion 84.

Next, the cam follower 63 in the shut-up mechanism 60 shown in FIG. 5 will be described.

The cam follower 63 includes the first slide member 91 and the second slide member 92. The first slide member 91 and the second slide member 92 are arranged in series with each other in the radial direction of the rotor 15, with the rotational center CL as a center. As shown in FIG. 11, the pin 91A is provided at a projected portion 91B on the outside of the first slide member 91. Similarly, the pin 92A is provided at a projected portion 92B on the outside of the second slide member 92. The pin 91A of the first slide member 91 is designed to abut against the first biasing portion 83. The pin 92A of the second slide member 92 is designed to abut against the second biasing portion 84.

The first slide member 91 and the second slide member 92 shown in FIG. 11 are both called lifters. The first slide member 91 and the second slide member 92 shown in FIG. 11 can be linearly moved in the directions X3 shown in FIG. 5 or in the directions X6 shown in FIG. 6 by a guide pin 110 and a guide pin 111 of the upper shell 11 shown in FIG. 8, respectively. In the condition of FIG. 5, the first slide member 91 and the second slide member 92 are linearly moved in the directions X3, namely, in approaching directions; in the condition of FIG. 6, the first slide member 91 and the second slide member 92 are linearly moved in the directions X6, namely, in parting directions.

As shown in FIG. 10, the first slide member 91 includes a pressing portion 120. Similarly, the second slide member 92 includes a pressing portion 121. The pressing portion 120 includes a contact surface 122 inclined at about 45°, and similarly, the pressing portion 121 includes a contact surface 123 inclined at about 45°. These contact surfaces 122 and 123 face each other, and are so designed as to abut against contact surfaces 124 and 125 inclined at about 45° of the core nut 19 serving as a second cam.

In the condition shown in FIG. 5, the first slide member 91 is abutted against the first biasing portion 83, and the first slide member 91 is biased in the direction X3. Similarly, the second slide member 92 is abutted against the second biasing portion 84, and the second slide member 92 is biased in the direction X3.

In view of this, the contact surface 122 of the pressing portion 120 of the first slide member 91 and the contact surface 123 of the pressing portion 121 of the second slide member 92 which are shown in FIG. 10 are pressed respectively against the contact surfaces 124 and 125 of the core nut 19 with forces F in the directions X3. Therefore, the core nut 19 and the center core 16 can stably generate components of force Fc toward the rotational center CL and components of force Fn toward the lower shell 13, as shown in FIG. 10. Accordingly, in the disk cartridge 10, the center core 16 together with the recording medium D can restrain the positions so that the recording medium D is prevented from chattering in three-dimensional directions of X, Y and Z. Moreover, simultaneously with this, the peripheral portion 41 of the center core 16 abuts against the inside surface 13G of the lower shell 13, so that the hole 31 in the lower shell 13 can be completely shut up with the center core 16. The shutter 33 shuts up the thus shut-up hole 31 more perfectly.

Next, an example of operation of the disk cartridge 10 will be described.

(1) The condition where the disk cartridge 10 is dismounted from the removable hard disk drive apparatus 1

First, the condition where the disk cartridge 10 is dismounted from the removable hard disk drive apparatus 1 shown in FIG. 1 will be described. The condition where the disk cartridge 10 is dismounted is shown in FIGS. 5, 8 and 10.

As shown in FIG. 5, the shutter 33 and the rack 47 have been moved in the direction X1 and are positioned, and the rack 47 is fixed by the shutter lock 20. Since the rack 47 is fixed by the shutter lock 20, the rotor 15 would not be rotated carelessly.

As shown in FIG. 5, the first slide member 91 and the second slide member 92 of the shut-up mechanism 60 are pressed in the directions X3 by the first biasing portion 83 and the second biasing portion 84, respectively. As a result, as shown in FIGS. 8 and 10, the pressing portion 120 of the first slide member 91 and the pressing portion 121 of the second slide member 92 have been moved in the directions X3, so that the contact surface 122 of the pressing portion 120 and the contact surface 123 of the pressing portion 121 are pressed respectively to the contact surface 124 and the contact surface 125 of the core nut 19. The forces F generated in this condition generate stably the components of force Fc for pressing the recording medium D toward the direction of the rotational center CL and the components of force Fn for pressing the recording medium D onto the lower shell 13.

Therefore, in the disk cartridge 10, restraint of position is effected so that the recording medium D is prevented from chattering in the three-dimensional directions X, Y and Z. Since the recording medium D and the center core 16 are in an integral condition and the center core 16 is fixed by pressing onto the inside surface 13G of the lower shell 13, the position of the recording medium D is restrained relative to the lower shell 13 through the center core 16 so as not to chatter in the three-dimensional directions X, Y and Z.

In addition, simultaneously with this, the center core 16 can shut up the hole 31 in the lower shell 13, and the hole 31 can be closed stably. Therefore, penetration of dust or gas in the external atmosphere to the recording medium D via the hole 31 can be obviated, and contamination and fouling of the recording medium D can be prevented completely. Moreover, since the hole 31 is further shut up with the shutter 33, it is difficult for dust or gas to be deposited on the center core 16.

(2) The condition where the disk cartridge 10 is inserted in the removable hard disk drive apparatus 1

Next, the condition where the disk cartridge 10 shown in FIG. 1 is inserted in the removable hard disk drive apparatus 1 will be described.

In this case, the disk cartridge 10 shown in FIG. 1 is inserted in the direction X1 into the insertion port 8 of the removable hard disk drive apparatus 1. The condition where the disk cartridge 10 is thus inserted in the removable hard disk drive apparatus 1 is shown in FIGS. 6 and 9.

When a member (not shown) of the removable hard disk drive apparatus 1 releases the locking condition of the shutter lock 20, the shutter 33 and the rack 47 are linearly moved in the direction X4 in FIG. 6 by an actuator 10A provided on the side of the removable hard disk drive apparatus 1. By this, the rotor 15 is rotated by, for example, about 45° in the direction X5 shown in FIG. 6 from the condition of FIG. 5.

As a result, as shown in FIG. 6, the projected portion 91B of the first slide member 91 is separated from the first biasing portion 83 and the projected portion 92B of the second slide member 92 is separated from the second biasing portion 84. As shown in FIG. 6, the first slide member 91 and the second slide member 92 can be moved in the directions X6, namely, in the parting directions.

On the other hand, as shown in FIG. 9, a chucking portion 36 of the spindle motor 3 on the side of the removable hard disk drive apparatus 1 is fitted into the lower side of the center core 16, and is magnetically chucked by the chucking magnet 37. By this, the center core 16 is pushed up in the direction Z1, so that the first slide member 91 and the second slide member 92 shown in FIG. 6 are linearly moved in the directions X6, namely, in the parting directions. In the condition shown in FIG. 9, the shutter 33 has already been spaced apart from the hole 31.

Since surplus gaps are generated between the core nut 19 and the pressing portion 120 of the first slide member 91 and the pressing portion 121 of the second slide member 92 as shown in FIGS. 6 and 9, the core nut 19, the center core 16 and the recording medium D as one body can be continuously rotated together with the rotor 3A of the spindle motor 3, with the rotational center CL as a center.

Thus, in the condition where the rotor 15 has been rotated in the direction X5 as shown in FIG. 6, the positions of the upper shell opening 11F in the upper shell 11 and the first opening 23 in the rotor 15 and the second opening 24 in the lower shell 13 coincide with each other, so that the head in/out opening 14 is fully opened, and the slider 6 of the head arm 4 shown in FIG. 1 can access the recording medium D via the head in/out opening 14 in the direction T.

In the above-described embodiment, the labyrinth structure portion 100 shown in FIG. 7 has a three-layer wall structure comprised of the first wall 25 of the rotor 15 also called a middle shell, the second wall 27 on the inside of the lower shell 13 and the third wall 28 on the outside of the lower shell 13.

However, according to the contamination tolerance level of the recording medium D, the labyrinth structure portion may be provided with a single-layer wall structure composed of only the first wall 25 of the rotor 15, or may be provided with a two-layer wall structure composed of the first wall 25 of the rotor 15 and the second wall 27 which is an internal wall. In addition, the rotor 15 may be provided not only with the first wall 25 but also with a fourth wall 4. The fourth wall is located on the inside of the first wall 25, and the second wall 27 is fitted between the fourth wall and the first wall 25.

In the embodiment of the present invention, the head in/out opening 14 for a read/write head can be opened and closed by simply rotating the rotor 15, without increasing the number of openings other than the head in/out opening 14. This can be realized by adopting a structure in which the rotor 15 is substantially cylindrical in shape.

In the embodiment of the present invention, the recording medium D is restrained relative to the conical core nut 19 serving as the second cam, by the linear motions of the first slide member 91 and the second slide member 92. However, the shape of the core nut 19 is not limited to the conical shape and is not particularly limited, provided that the restraint in the three-dimensional directions X, Y and Z is realized by simultaneously generating the components of force Fn for pressing the center core 16 against the lower shell 13 along the rotational center CL and the components of force Fc orthogonal thereto.

As shown in FIGS. 5 and 6, the first biasing portion 83 and the second biasing portion 84 are provided respectively at the first guide portion 71 and the second guide portion 72 of the first cam 61, whereby the pressing forces F1 for pressing the first slide member 91 and the second slide member 92 can be generated stably, without adding new component parts and while minimizing the influences of the rotational positional accuracy of the rotor 15, the accuracy of the cam grooves, the tolerance of the first slide member 91 and the second slide member 92, the positional accuracy of the core nut 19, etc.

Since the first slide member 91 and the second slide member 92 are pressed with the stable forces F1 in the directions X3 by the first biasing portion 83 and the second biasing portion 84, respectively, stable forces F can be exerted onto the core nut 19 as shown in FIG. 10. The forces F each generate the component of force Fc for pressing the recording medium toward the direction of the rotational center CL and the component of force Fn for pressing the recording medium against the inside surface of the lower shell 13. As a result, the position of the recording medium D can be restrained relative to the lower shell 13 so as to prevent the recording medium D from chattering in the three-dimensional directions X, Y and Z.

In the embodiment of the present invention, the labyrinth structure portion 100 which is long in the circumferential direction is provided for ensuring that gaps communicated with the atmosphere surrounding the disk cartridge are not generated at portions other than the head in/out opening 14 while minimizing the enlargement of the outside dimensions of the disk cartridge. In addition, at the time of accessing to the recording medium D via the head in/out opening 14 for the read/write head there is no need for generating new extra openings as in the related art, so that fine particulate dust and gas can be shut off sufficiently. Therefore, prevention of contamination of the recording medium can be remarkably enhanced.

In addition, the above-described shut-up mechanism 60 is provided for preventing the recording medium D from chattering when the recording medium D has been dismounted from the removable hard disk drive apparatus 1 and is being carried or handled. By this, even when an external force such as vibration and impact is exerted on the disk cartridge during carrying or handling of the disk cartridge, the recording medium D is perfectly prevented from chattering, whereby breakage or contamination of the recording medium D can be prevented.

Moreover, since the gap between the center core to be engaged with the spindle motor on the removable hard disk drive apparatus 1 side and the lower shell can be stably shut up with the center core, penetration of fine particulate dust or gas via the hole in the lower shell and the center core can be perfectly prevented. Therefore, the reliability of the disk cartridge in use can be remarkably enhanced.

The present invention is not limited to the above-described embodiment. In the above embodiment, a hard disk has been described as an example of the disk form recording medium for magnetic recording and reproduction. However, the recording medium is not limited to the hard disk, and other kinds of disks may naturally be adopted.

What is claimed is:

1. A disk cartridge for containing a disk form recording medium therein, including an opening through which a head for reading or writing information recorded on said recording medium is inserted, comprising:
    a first shell and a second shell disposed opposite to said first shell, for constituting therebetween a containing space for containing said recording medium;
    a rotor disposed in said containing space so as to be rotatable around the center of rotation of said recording medium; and
    a shut-up mechanism for restraining the rotation of said recording medium relative to said first shell,
    wherein said shut-up mechanism comprises,
        a first cam formed in said rotor;
        a cam follower capable of linear motion along said first cam of said rotor; and
        a second cam;
    wherein said second cam is pressed by said cam follower to restrain the rotation of said recording medium relative to said first shell;
    wherein any one of said first shell, said second shell, and said rotor is provided with a first wall, while another of said first shell, said second shell, and said rotor is provided with a second wall;
    wherein said first wall and said second wall constitute a labyrinth structure.

2. The disk cartridge as claimed in claim 1, wherein said first wall and said second wall are provided along the circumferential direction of said recording medium.

3. The disk cartridge as claimed in claim 2, wherein
    said first wall is projected upwards or downwards in a direction parallel to the rotational axis of said rotor; and
    said second wall is projected in a direction parallel to the rotational axis of said rotor and opposite to the direction in which said first wall is provided.

4. The disk cartridge as claimed in claim 1, wherein
    said first wall of any one of said first shell, said second shell, and said rotor is provided with a first opening for constituting said opening; and
    said second wall of another of said first shell, said second shell, and said rotor is provided with a second opening for constituting said opening.

5. The disk cartridge as claimed in claim 1, wherein one of said first shell, said second shell, and said rotor is provided with a third wall.

6. The disk cartridge as claimed in claim 1, comprising:
    a center core for holding said recording medium; and
    a hole provided in said first shell for putting in and out a chucking portion for chucking said recording medium, wherein
    the rotation of said recording medium is restrained relative to said first shell when said opening is closed and said hole is shut up with said center core.

7. The disk cartridge as claimed in claim 6, comprising a shutter for opening and closing said hole in said first shell, and a shutter-moving portion for moving said shutter.

8. The disk cartridge as claimed in claim 7, wherein said shutter-moving portion comprises:
    a pinion provided in the outer circumference of said rotor; and
    a rack capable of linear motion in engagement with said pinion.

9. The disk cartridge as claimed in claim 1, wherein
    said first cam comprises a first guide portion and a second guide portion disposed at symmetric positions in said rotor with respect to the center of rotation of said recording medium, and
    said cam follower comprises:
    a first slide member put into linear motion in the radial direction of said recording medium by said first guide portion; and
    a second slide member put into linear motion in the radial direction of said recording medium by said second guide portion.

10. The disk cartridge as claimed in claim 9, wherein said second cam comprises a conical portion pressed by said first slide member and said second slide member put into linear motion in the radial direction of said recording medium.

11. The disk cartridge as claimed in claim 9, wherein said first guide portion of said first cam comprises a first biasing portion for pressing said first slide member against said second cam for restraining the rotation of said recording medium relative to said first shell, and said second guide portion of said first cam comprises a second biasing portion for pressing said second slide member against said second cam.

12. A disk drive apparatus into which a disk cartridge containing a disk form recording medium therein is inserted and which is for reading or writing information recorded on said recording medium, wherein said disk cartridge comprises:

a first shell and a second shell disposed opposite to said first shell, for constituting therebetween a containing space for containing said recording medium;

a rotor disposed in said containing space so as to be rotatable around the center of rotation of said recording medium; and a shut-up mechanism for restraining the rotation of said recording medium relative to said first shell, wherein said shut-up mechanism comprises, a first cam formed in said rotor;

a cam follower capable of linear motion along said first cam of said rotor; and a second cam;

wherein said second cam is pressed by said cam follower to restrain the rotation of said recording medium relative to said first shell;

wherein any one of said first shell, said second shell, and said rotor is provided with a first wall, while another of said first shell, said second shell, and said rotor is provided with a second wall;

wherein said first wall and said second wall constitute a labyrinth structure.

13. The disk drive apparatus as claimed in claim 12, wherein said disk cartridge can be mounted and dismounted.

* * * * *

UNITED STATES PATENT AND TRADEMARK OFFICE
CERTIFICATE OF CORRECTION

PATENT NO. : 7,082,611 B2 Page 1 of 1
APPLICATION NO. : 10/637508
DATED : July 25, 2006
INVENTOR(S) : Masami Miike It is certified that error appears in the above-identified patent and that said Letters Patent is hereby corrected as shown below:

Title Page:
Item (73) should be listed and should read as follows:
    -- Sony Corporation, Tokyo (JP) --.

Signed and Sealed this

Twenty-sixth Day of June, 2007

JON W. DUDAS
*Director of the United States Patent and Trademark Office*